Figure 1:
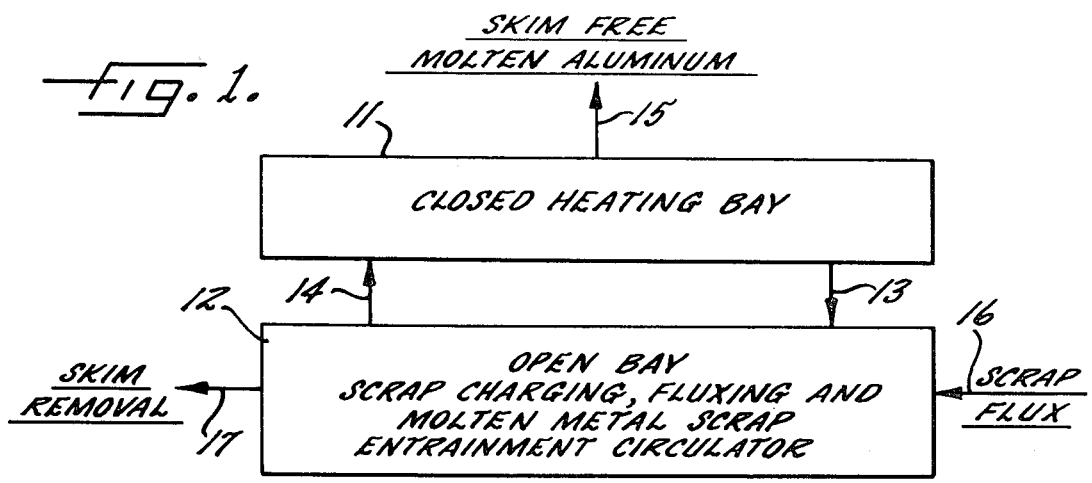

United States Patent [19]
Claxton

[11] 4,386,764
[45] Jun. 7, 1983

[54] APPARATUS FOR SUBMERGING, ENTRAINING, MELTING AND CIRCULATING METAL CHARGE IN MOLTEN MEDIA

[76] Inventor: Raymond J. Claxton, 7123 Lyre La., Dallas, Tex. 75214

[21] Appl. No.: 336,912

[22] Filed: Jan. 4, 1982

Related U.S. Application Data

[62] Division of Ser. No. 110,657, Jan. 9, 1980, Pat. No. 4,322,245.

[51] Int. Cl.³ .............................................. F27B 3/04
[52] U.S. Cl. .................................... 266/235; 266/901
[58] Field of Search ................. 75/68 R, 93 R, 1 AC, 75/235; 266/901

[56] References Cited

U.S. PATENT DOCUMENTS

| | | | |
|---|---|---|---|
| 1,797,276 | 3/1931 | Stay et al. | 266/901 |
| 2,600,525 | 11/1953 | Foster | 75/77 |
| 3,997,336 | 12/1976 | van Linden et al. | 266/235 |

Primary Examiner—M. J. Andrews
Attorney, Agent, or Firm—Harold A. Williamson

[57] ABSTRACT

This invention relates to a method and a system including apparatus for submerging, entraining, melting and circulating aluminum scrap in a molten metal media, which scrap is comprised of pieces not capable of self-submergence. The apparatus of the system includes means to introduce a supply of scrap into an open bay that has heated molten metal drawn from an entry point below the surface of the molten metal by the action of a molten metal scrap entrainment circulator submerged beneath the surface of the molten metal at a point beneath the entry point of the heated molten metal. The circulator continuously draws the heated molten metal including the scrap into the circulator wherein the scrap is completely entrained in the molten metal and delivered into a molten metal circulation path that delivers the scrap metal entrained in the molten metal for subsequent heating further melting and recirculation to the circulator.

7 Claims, 9 Drawing Figures

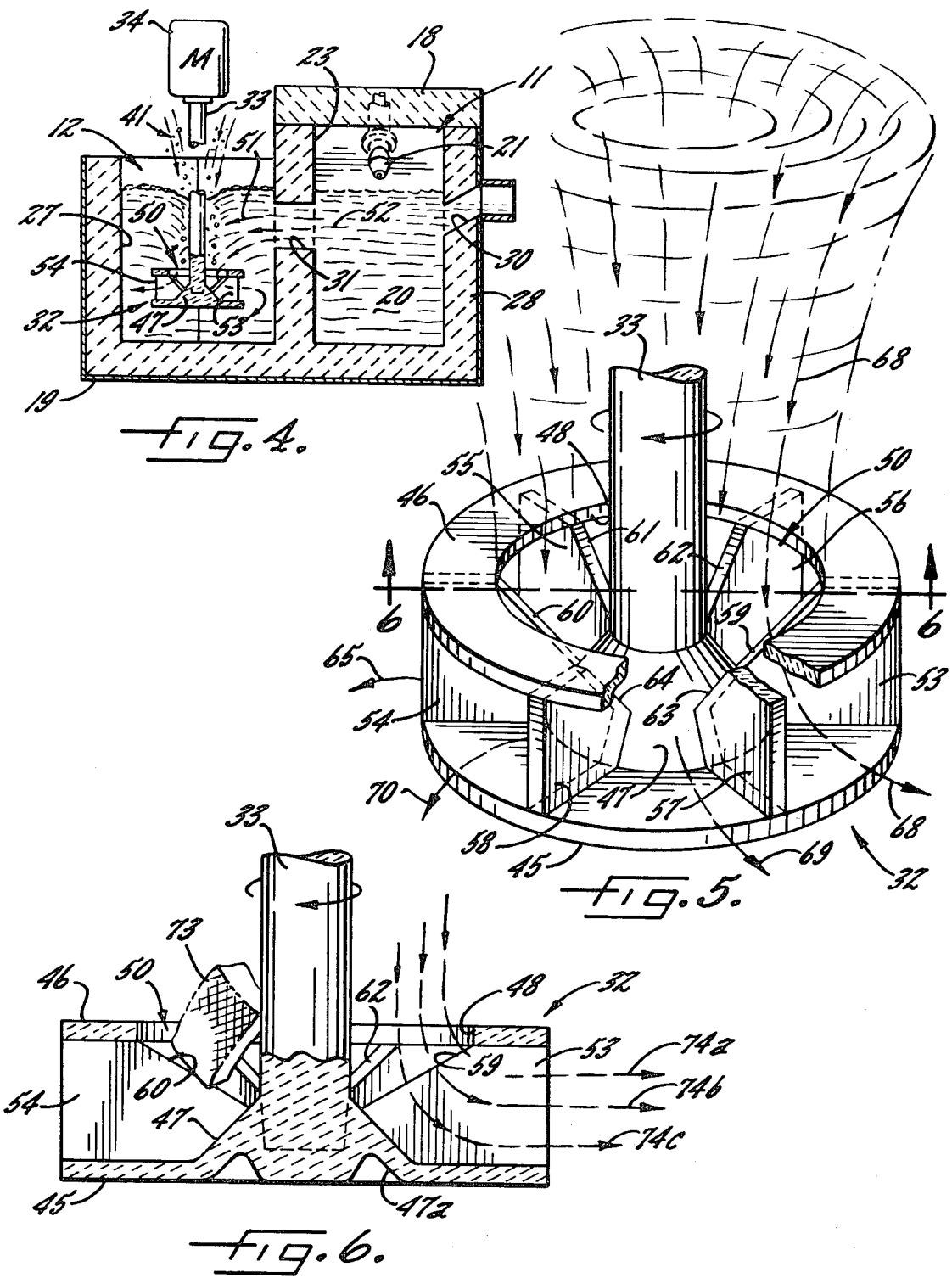

4,386,764

APPARATUS FOR SUBMERGING, ENTRAINING, MELTING AND CIRCULATING METAL CHARGE IN MOLTEN MEDIA

This application is a division of my application, Ser. No. 110,657 filed Jan. 9, 1980 now U.S. Pat. 4,322,245.

This invention relates to an improved method and apparatus for submerging, entraining, melting and circulating a metal charge in a molten metal media.

More specifically this invention relates to a method and a system including apparatus for submerging, entraining, melting and circulating aluminum scrap in a molten media, which scrap is comprised of pieces not capable of self-submergence. The apparatus of the system includes means to introduce a supply of scrap into an open bay that has heated molten metal drawn from an entry point below the surface of the molten metal by the action of a molten metal scrap entrainment circulator submerged beneath the surface of the molten metal at a point beneath the entry point of the heated molten metal. The circulator continuously draws the heated molten metal including the scrap into the circulator wherein the scrap is completely entrained in the molten metal and delivered into a molten metal circulation path that delivers the scrap metal entrained in the molten metal for subsequent heating further melting and recirculation to the circulator.

The recycling of scrap aluminum that has a high surface to volume ratio causes the scrap to float on the surface of the molten aluminum. The presence of scrap that resists sinking has been the bane of aluminum recycling processors whether they be large or small. The fact that larger manufacturers have unlimited capital resources to invest in the improvement of the aluminum recycling processes has lead to increasingly sophisticated shapes to the systems that pump the molten aluminum through the heating and melting phases of the system. These systems appear in drawings to be simple in a functional layout sense. Rarely mentioned is the great expense of forming from refractory material the pumps which are precisely designed to cooperate with the specially contoured walls that surround the pump impeller or the walls that provide a volute through which the molten metal along with scrap is delivered to the pump. The walls that surround and house the pump are made of refractory material. Their fabrication, forming and later maintenance represent a significant expense. In respect of maintenance it should be kept in mind that the shop environment in which recycling is performed is hostile, insofar as the rough handling of the materials charged into the furnaces is concerned. The loading and subsequent cleaning of the system subject the walls to damage. This damage may be costly to repair especially when a precisely formed wall surface in the region of the pump is involved. The expensive nature of the construction and repair just described renders these approaches unacceptable to a small recycling concern because of the cost.

A pump jamming problem is not an uncommon occurrence when there is an inadvertent inclusion of non-aluminum scrap, such as steel, in the scrap charged into the system. The non-aluminum scrap can become lodged between a pump impeller and the cooperating walls that surround the pump impeller thereby bringing the impeller to a stop. The walls and pump impeller are frequently damaged when this occurs.

Fine examples of how the art has been advanced in respect of pump impeller and surrounding wall design of the type just described can be found in the U.S. Pat. to van Linden et al No. 3,997,336 and No. 4,128,415 as well as Claxton et al No. 3,984,234. Each of these patents recognizes and treats the problem of submerging scrap that is inherently non-self-submerging. Additionally these patents recognize and attempt to treat the problem of skim developing on the surface of the molten aluminum. The formation of skim or dross, as it may be termed, in aluminum melting processes is an especially noxious problem due to the fact that the skim which is primarily aluminum oxide quickly forms due to the highly reactive nature of aluminum and the atmosphere enhanced by the presence of high temperatures of the molten metal. The pump impellers of each of the patents noted next above are positioned in close proximity to the walls that cooperate with the pump impeller to either enhance the pumping action or guide the molten aluminum carrying scrap to the pump. The problems of impeller pump jamming and skim generation, though considered by the patentees noted above, has not been avoided. This is especially true in respect of jamming when a piece of non-meltable material such as refractory material having the same specific gravity as aluminum, and which therefore flows in the molten metal, is delivered to the pump portion of the system.

The invention to be described more fully hereinafter completely eliminates the need for closely spaced walls adjacent an impeller typical of the prior art while simultaneously providing for scrap entrainment in molten metal along with a concurrent reduction of skim formation.

It is therefore a primary object of the invention to provide an inexpensive method and apparatus for submerging, entraining, melting and circulating aluminum scrap which scrap is characterized by not being capable of self-submergence.

Another object of the invention is the provision of a molten metal circulator that cooperates with a molten metal media in such a fashion that non-self-submerging scrap is drawn into the molten metal media and is melted.

Yet another object of the invention is to provide a system in which there is a molten metal circulator that cooperates with a molten metal media and vertically disposed walls to thereby establish a fluid current path in the molten metal media which fluid current path causes the molten metal to move through the system.

Still yet another object of the invention is to provide a furnace and molten metal holding bay that is simple in construction and easy to clean and service.

Figure 2:
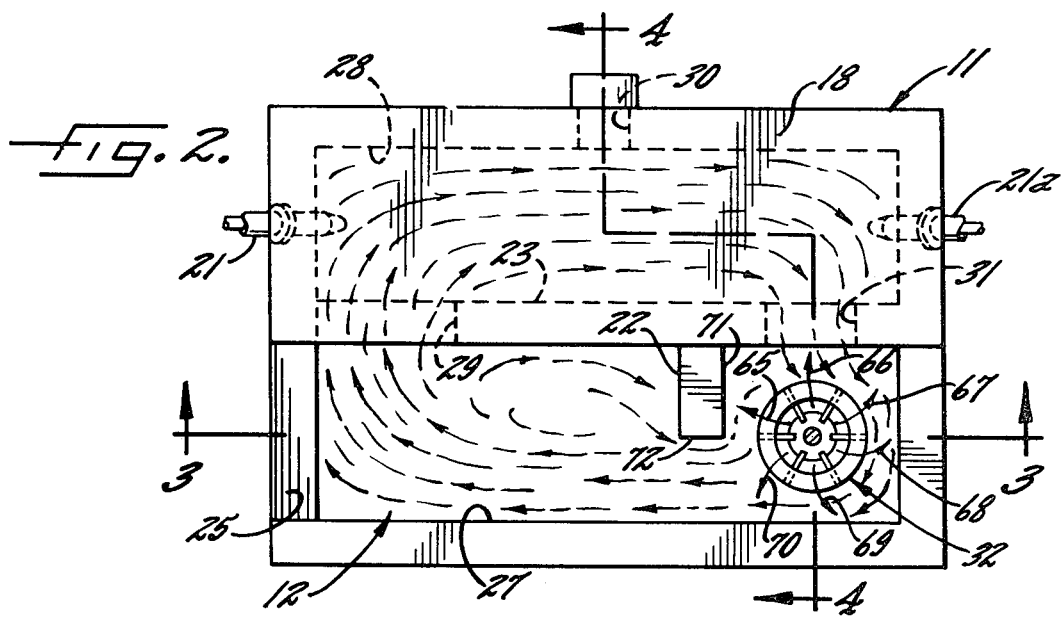
Figure 3:
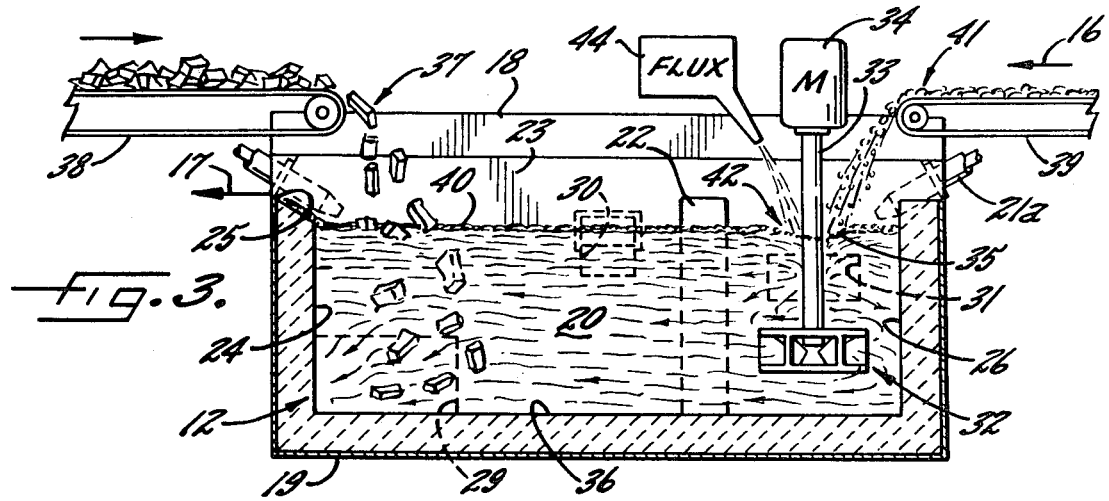
Figure 7:
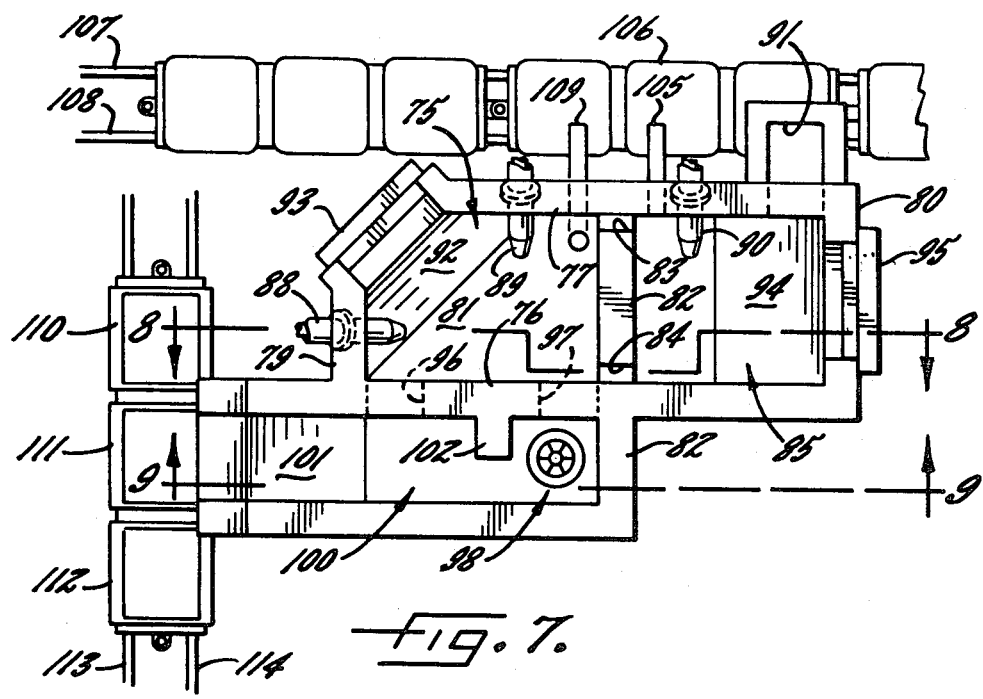
Figure 8:
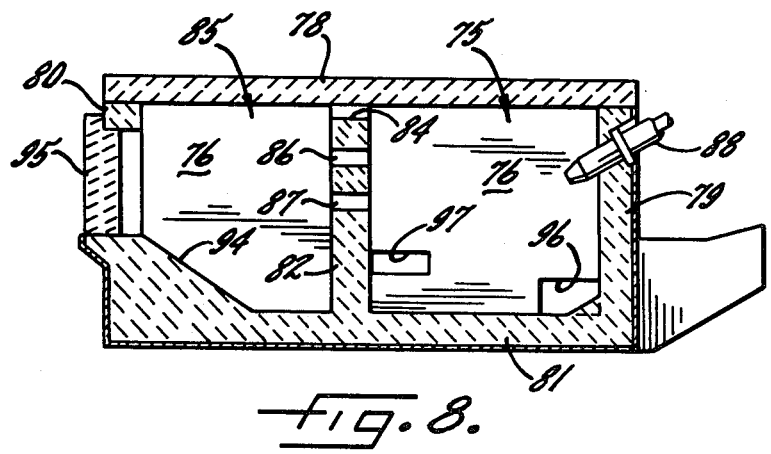
Figure 9:
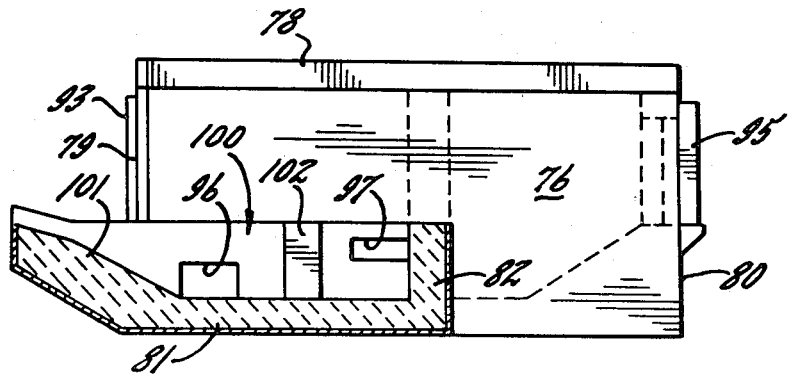

Other objects and advantages of the present invention will become apparent from the ensuing description and the illustrative embodiment thereof, in the course of which, reference is made to the accompanying drawings in which:

FIG. 1 is a block diagram of a recirculating scrap melting system that embodies the invention, FIG. 2 is a top plan view of the apparatus involved in the preferred embodiment of the invention, FIG. 3 is an elevational section taken along line 3—3 in FIG. 2, FIG. 4 is a view along lines 4—4 in FIG. 2, FIG. 5 is a three dimensional view of a molten metal, scrap entrainment circulator, FIG. 6 is a view along line 6—6 in FIG. 5, FIG. 7 is a top plan view of a furnace, holding bay and molten media circulator system that embodies the invention, FIG. 8 is a view along line 8—8 in FIG. 7, and FIG. 9 is a view along line 9—9 in FIG. 7.

Reference is now made to FIG. 1 which depicts in block diagram form a recirculating scrap melting system that will embody the invention. The apparatus of the system includes a closed heating bay 11 and an open bay 12. In the open bay 12 scrap and flux are introduced. A scrap entrainment molten metal circulator described more fully hereinafter positioned in the open bay 12 causes molten metal to circulate from the closed heating bay 11 into the open bay 12 as indicated by flow arrow 13. The molten metal is then circulated into the closed heating bay 11 as indicated by flow arrow 14. Scrap and flux are introduced at one end of the open bay 12 as indicated by flow arrow 16 and skim or dross is removed from the opposite end of the open bay 12 as indicated by flow arrow 17. The final product of the systems apparatus is skim free molten aluminum delivered from the closed heating bay 11 as indicated by flow arrow 15.

Reference is now made to FIG. 2 and FIG. 3 which illustrate respectively a top plan view and a front elevation sectional view showing the details of the preferred embodiment of the invention.

The description that follows will describe the apparatus of both FIG. 2 and FIG. 3 at the same time. In FIG. 2 there is shown a closed heating bay 11 and an open bay 12. The closed heating bay and its details of construction are conventional in the sense that a cover 18 is positioned over the closed heating bay 11. The closed heating bay 11 and open bay 12 are constructed of refractory material. As best seen in FIG. 3 the refractory material is enclosed by a metal shell 19. The metal shell 19 is preferably steel. A pair of burners 21, 21a are shown directed downwardly into the heating bay 11. The nature and function of the burners 21, 21a is similar to burners currently used by industry. Only two burners are shown. It should be understood that the arrangement of burners and their number are a matter of design dependent on the type of burner available and the nature of the fuel employed in the combustion process. The open and closed bays 11, 12 are shown filled with a molten metal media 20 in the preferred embodiment the molten metal is aluminum.

The open bay 12 is provided with a wall segment 22 formed of refractory material and integrally connected to a separating wall 23 that extends the length of both the closed heating bay 11 and the open bay 12. The open bay has end walls 24, 26 and front wall 27. The closed heating bay 11 has a back wall 28.

The separating wall 23 has two openings 29, 31. The location of separating wall 23 openings 29, 31 are important to the operation of the system apparatus and the method involving the invention. A molten metal scrap entrainment circulator 32 is connected by a drive shaft 33 to a motor 34. The motor 34 may be an electric or any suitable motor the speed of which can be selected. It can be seen that the circulator 32 is positioned midway between the wall segment 22 and end wall 26. The opening 31 is also positioned midway between the wall segment 22 and end wall 26 at a point above the circulator 32 but beneath the surface 35 of the molten metal media 20. The relative locations, as shown, of the circulator 32, the opening 31 and wall segment 22, provide optimum performance for the method of the invention.

The circulator 32 driven by motor 34 creates a fluid current path of molten metal. This molten metal path indicated by arrows not referenced draws molten metal through the opening 31 and circulates the molten metal through the open bay 12 and thence through opening 29 and back into the closed heating bay 11. Though not shown in the drawings it should be understood that there is little or no skim on the surface of the molten material in the heating bay 18. There is of course a very thin layer of oxide skin that is present on the surface of the molten material of the heating bay. It should be noted that all the walls of the heating and open bay are simple straight, vertically disposed walls which are easily and inexpensively formed of refractory material. The term inexpensive is intended to be a relative term which takes into account more sophisticated wall shapes of currently available scrap recycling systems noted earlier. The dynamic operation of the molten metal scrap entrainment circulator 32 will be explained more fully hereinafter. The opening 29 in separating wall 23 is located such that its lower side (not referenced) is flush with the floor 36 of the closed bay 11 and open bay 12. The location of the opening 29 is important from the standpoint that large and readily submersible scrap 37 sinks to the bottom of the open bay is caught up in molten metal fluid current path generated by the circulator 32 and can be delivered to the closed heating bay 11 where the large pieces are melted. Practically speaking the submersible scrap 37 sinks to the bottom where much of it is melted in the position in which it comes to rest.

In FIG. 3 it can readily be seen that scrap is introduced to the open bay 12 at either end by conveyors 38, 39. The scrap 37 on conveyor 38 as already noted is of the larger type that is self-submerging because of its weight and shape.

The conveyor 39, however, carries scrap 41 that has by its nature a high surface area to volume ratio and therefore tends not to be self-submersible. Shredded aluminum cans or entire cans, as well as small chips collected from manufacturing operations are typical of non-self-submersible scrap.

Non-self-submersible scrap in order to be drawn into the molten metal 20 must overcome the surface tension of the layer of skim 40 that forms on molten metal 20. The non-self-submersible scrap 41 is introduced as shown into a mild vortex 42 created by the circulator 32. A severe vortex is to be avoided because the severe vortex while drawing the non-self-submersible scrap into the molten metal also draws the surrounding atmosphere into the vortex thereby greatly enhancing the formation of skim which is a very undesirable by-product. The mold vortex 42 cooperates with the molten metal drawn through the opening 31 to thereby submerge the non-self-submerging scrap 41 into the molten metal 20. The circulator by its dynamic action to be described completely entrains the scrap 41 in the molten metal 20 where the scrap begins to be melted. The circulator 32 delivers molten metal with scrap entrained into a fluid current path. The scrap is then melted by heat drawn from the flowing molten metal media during the passage through the open bay 12 and thus becomes part of the circulating molten media.

The closed heating bay 11 has in it back wall 28 and opening 30 through which skim free molten aluminum is delivered. In FIG. 3 it can be seen that the opening 30 in back wall 28 is located at a point beneath the surface of the molten metal 20 such that any skim that is present in the closed heating bay 12 does not enter the finished molten metal 15. The finished molten metal 15 overflows the heating bay 11 through the specially configured passage 30 at a rate substantially commensurate with the rate of introduction of solid scrap to the open bay 12.

The removal of skim and the introduction of a fluxing agent to the system can best be seen in and understood by a study of FIG. 3. Flux supply 44 is shown delivering a fluxing agent into the mild vortex 42 as shown.

Skim removal is accomplished as shown in FIG. 3 by the provision of a ramped shaped top surface 25 at the top of end wall 24. As skim 40 forms and is moved by the action of the moving molten metal 20 it tends to build up on the ramp 25 where it may be removed manually or by an automated means not shown.

Reference is now made to FIG. 4 wherein reference numerals employed in respect of FIGS. 1 to 3 are utilized to identify the same components. The molten metal scrap entrainment circulator 32 is shown in section in order to facilitate an explanation of the dynamics of its operation insofar as the circulator 32 acts upon the molten metal 20 to draw molten metal from the closed heating bay 11 through the opening 31 and into a central region 50 of the circulator 32. The fluid current path of molten metal from the closed heating bay 11 is shown by broken line arrows 51, 52.

Non-self-submersible scrap 41 shown entering from above into the mild vortex 42 is caught in the current flow and drawn down into the central opening 50 of the circulator 32 where the scrap is completely entrained in the moving molten metal. The circulator 32 has vanes 53, 54 connected at an inner end to a frusto conical hub 56 shown in section. The scrap 41 entrained in molten metal is propelled outwardly along the vanes. The details of the circulator 32 and its specific operation will be explained more fully in respect of the description of FIG. 5 and FIG. 6.

Reference is now made to FIG. 5 which illustrates in three dimensional form the molten metal scrap entrainment circulator 32. The circulator 32 is formed of refractory material and constructed by conventional techniques. The circulator has what may be termed a bottom plate 45 and a top plate 46. The top and bottom plates 45, 46 are spaced apart as shown and have integrally secured thereto a plurality of radially extending vanes 53, 54, 55, 56, 57 and 58. A frusto conical shaped hub 47 is integrally secured to the bottom plate 45 at the center thereof. The frusto conical hub 47 has a drive shaft 33 fitted into the hub 47 in a manner not shown. The height of the hub 47 is less than the distance between the top and bottom plates 46, 45. The vanes 53, 54, 55, 56, 57 and 58 at their inner radial ends are integrally secured to hub 47 at a point on the hub 47 outer surface between the top and bottom of the frusto conical hub as shown. The bottom radially extending edges of the vanes are secured to the bottom plate 45 and the outer ends of the vanes are secured to the top plate 46 as shown. The top plate 46 has a central circular opening 48, which circular opening 48 has a center axis coincident with the center axis of the drive shaft 33. It is important to the operation of the circulator 32 that inside diameter of the central circular opening 48 be greater than the outside diameter of the base of the frusto conical hub 47. The downwardly sloping sides 59, 60, 61, 62, 63 and 64 of the vanes 53, 54, 55, 56, 57 and 58 in cooperation with the frusto conical hub 47, the top and bottom plates 46, 45, act to create broad region of suction (shown in dotted outline) extending above and around the circulator 32. A strong fluid flow current path as shown by arrow 68 draws molten metal delivered from the heating bay 11 as described earlier along with non-self-submersible scrap down into the circulator 32 where the scrap is completely entrained and then expelled outwardly towards the surrounding walls of the open bay 12 noted earlier.

Returning now to FIG. 2 it can be seen that the outward radial flow as evidenced by arrows 65, 66, 67, 68, 69 and 70 because of the clockwise rotation of the circulator 32 cause a build up of pressure against the side 71 of wall segment 22, the separating wall 23, end wall 26 and front wall 27. The only relief for this pressure is through the opening defined between the end 72 of wall segment 22 and front wall 27. It is the constant release of this pressure that establishes the strong fluid current flow path through the molten metal media that delivers entrained scrap and molten metal through the open bay 12, and then delivers the molten metal product resulting from the combination of freshly melted scrap and the surrounding molten metal through the opening 29, the closed heating bay 11 and thence to the opening 31 where the circulator 32 draws the molten metal into the circulator to begin the cycle anew. It is important to note that the circulator 32 is spaced away from the walls that surround it thereby preventing any large pieces of non-meltable scrap from becoming jammed between the circulator 32 and the walls. The possibility of damage to the circulator and walls from this type of jamming is therefore removed.

Reference is now made to FIG. 6 which illustrates the circulator 32 of FIG. 5 in section. As has been noted earlier there is an ever present possibility that non-meltable scrap or even pieces of refractory material may enter the molten metal media and thereafter come in contact with whatever means is provided to move the molten metal through the system. In FIG. 6 there is shown a foreign object 73 lodged in the central region or opening 50. It is a simple procedure to remove the object 73 by merely lifting the circulator 32 momentarily from the molten metal, after stopping the motor, and with tongs removing the object 73. In the event that this foreign object not enter the center opening but strike the top plate 46, the object would fall harmlessly between the circulator 32 and the spaced away walls in the vicinity of the circulator 32. It should be further noted that the circulator 32 of FIG. 6 has formed in the bottom plate 45 thereof a grooved or notched portion 47a as shown. This groove 47a prevents cracking due to curing rate differences in different sections of the refractory casting of the circulator 32.

The section of FIG. 6 allows a clear showing of molten metal fluid current paths 74a, 74b, 74c through the circulator 32.

Reference is now made to FIG. 7 which illustrates in a top plan view a furnace, holding bay and molten media circulator system that embodies this invention. The description up to this point has treated primarily the cooperative relationship of the molten metal or media circulator and the manner in which the circulator advantageously functions to entrain and melt scrap. FIGS. 7, 8 and 9 provide a detailed showing of additional features of the invention as the invention finds utility in a complete system.

More specifically there is shown a closed heating bay 75 and a closed holding bay 85. The heating bay 75 and holding bay 85 are formed in a common chamber defined by a front wall 76, a back wall 77, a cover 78, a first end 79, a second end 80 and finally a floor 81. The cover 78 is not shown in FIG. 7. A dividing wall 82 separates a heating region in the heating bay 75 from a holding region in the holding bay 85. The dividing wall 82 has a number of passages 83, 84, 86 and 87 which provide for communication between the heating bay 75 and the holding bay 85.

As best seen in FIG. 7 passages 83 and 84 allow molten media (not shown) to pass freely from the heating bay 75 to the holding bay 85. As shown in FIGS. 7 and 8, passages 86a, 86, and 87 allow combustion gases from the oil or gas treaters 88, 89 to move freely over the surface of the molten media from the heating bay 75 to the holding bay 85. The combustion or flue gases as they are formed are vented through a stack 91.

In the heating bay 75 there is provided a clean-out ramp 92 which terminates at its upper end with a closure in the form of a guillotine door 93. The holding bay 85 also has a clean-out ramp 94 and guillotine door 95.

Front wall 76 has openings 96, 97 through which molten media is circulated by molten media circulator 98 here shown schematically. The circulator 98 is shown positioned in an open bay 100. The open bay 100 has skim ramp 101 and wall section 102 as shown.

A tapping spout 105 for molten metal or media is provided as shown in FIG. 7. The tapping spout 105 is shown positioned such that a mold train 106 carried by rails 107, 108 can carry the molten metal or media away for subsequent processing. A heating bay and open bay drain spout 109 is positioned as shown.

Skim pans 110, 111, 112 are shown carried by rails 113, 114.

The location of guillotine door 93 is important to the invention in that when this door 93 is opened ready access can be had to service opening 96, 97, as well as passages 83, 84, 86 and 87.

In view of the above description it should be abundantly clear that the system and apparatus as well as the method of the systems operation provides a distinct improvement over the state of art all in a manner that is simple and less expensive than heretofore available.

Although a single embodiment of the present invention has been illustrated and described, it will be apparent to those skilled in the art that various changes and modifications may be made to this embodiment without departing from the spirit and scope of the invention.

I claim:

1. A recirculating melting system for submerging and entraining a charge in a molten melting media wherein said charge comprises pieces not capable of self-submergence, said system including in combination,
   a closed heating bay, and
   an open charging bay having vertical walls,
   said molten melting media filling said closed heating bay and said open charging bay to a predetermined level,
   vertical wall means separating said closed heating bay from said open charging bay,
   said vertical wall means having integral therewith a vertical wall segment extending into said open charging bay, said vertical wall means further having two openings through said vertical wall means, such that said openings are always beneath the surface of said molten melting media, one of said openings on either side of said vertical wall segment,
   a molten media circulator submerged in said molten melting media and positioned to one side of said vertical wall segment and at a point beneath one of said openings in said vertical wall means,
   means to introduce said charge into said open bay in the vicinity of said submerged molten media circulator to thereby initiate melting of said charge in said molten melting media,
   said molten media circulator acting upon said molten melting media to circulate said molten melting media from said closed heating bay into said open charging bay by drawing molten media from said closed heating bay through said opening in said wall in the immediate vicinity of said molten media circulator, said initial scrap melting and drawing of said molten melting media being induced directly by said molten media circulator, said molten media circulator cooperating with said molten melting media and said vertically disposed walls to thereby establish a molten melting media circulation path,
   said molten media circulator having a spaced apart bottom plate and top plate, said top plate having a circular opening centrally disposed therein, said bottom plate having centrally disposed a frusto conical hub integrally secured thereto at its base, said frusto conical hub having a central axis coincident with the center axis of said top plate circular opening, said hub having a drive shaft secured thereto; radially extending vanes secured to said hub and along the entire radial length thereof to said bottom plate, said top plate central circular opening having an inside diameter greater than that of said frusto conical hub, said vanes secured at the ends thereof to said top plate;
   rotation of said drive shaft creating by the cooperation of said molten melting media with said circulator vanes, frusto conical hub, top and bottom plate, a mild vortex in said molten melting media to thereby entrain said charge in said molten melting media and deliver entrained charge into and through said central opening in said top plate in a vertically downward direction whereupon said molten melting media and said charge is turned from said vertically downward direction and thence through the space betweeen said plates into horizontally outward direction to thereby provide said molten melting media circulation path in said molten melting media which draws said molten melting media from said closed heating bay through said wall opening adjacent said circulator and into said open charging bay and thereafter from said open charging bay through said opening remote from said molten metal circulator to said closed heating bay.

2. The recirculating scrap melting system of claim 1 wherein said charge is scrap, which scrap is comprised of aluminous cans, can portions, said chips or punchings.

3. The recirculating scrap melting system of claim 1 wherein the wall opening remote from said molten media circulator is located such that the bottom of said opening is at a point lower than said molten media circulator and the top of said opening is at a point beneath the surface of said molten melting media.

4. The combination of claim 1 which further includes means to introduce a fluxing agent into said open bay along with said charge in close proximity to said molten media circulator.

5. The combination of claim 1 which further includes means to continuously remove molten media from said current path at a rate approximating the rate of introduction of said scrap.

6. The combination of claim 1 which further includes means to facilitate the removal of skim from the surface of the molten melting media above the molten media current path prior to reheating in said closed bay.

7. A furnace and holding device for a molten media including in combination, a common chamber, said common chamber separated into a heating region and a holding region by a dividing wall, said common chamber having a first and second end, a front wall and a back wall, said dividing wall extending between said front wall and said back wall and having passages therein to thereby simultaneously allow physical movement of molten media between said heating region and said holding region as well as movement of heated atmosphere above said molten media between said heating region and said holding region, molten media circulating means integral with said front wall and adjacent said heating region, said front wall having at least two openings in communication with said molten media circulating means, a closure means positioned in a vertical plane that intersects said first end and said back wall such that when said closure means is open, direct access to said passages and said openings is readily attainable to thereby facilitate the servicing of said passages and said openings, heating means disposed in said heating and holding regions, and means venting said common chamber at a point above the molten media, molten media tapping means in communication with said holding region.

* * * * *